3,287,082
T-ALKYL CHROMATE OR T-CYCLOALKYL CHROMATE TREATED POLYOLEFINS
John R. Caldwell and Russell Gilkey, Kingsport, Tenn., assignors to Eastman Kodak Company, Rochester, N.Y., a corporation of New Jersey
No Drawing. Filed Dec. 29, 1965, Ser. No. 517,470
7 Claims. (Cl. 8—115.5)

This application is a continuation-in-part of our U.S. patent application Serial Number 109,833 filed May 15, 1961, which application is a continuation-in-part of our U.S. patent application Serial Number 637,082, filed January 30, 1957, now U.S. Patent 2,984,634.

This invention relates to a process for the production of crystallizable polymeric hydrocarbons having an improved affinity for dyes, printing inks, and sizing agents, and the like, and to the products thus produced. More particularly, this invention concerns the surface treatment of polyhydrocarbon fibers, films and other shaped objects with chromium trioxide to impart valuable surface characteristics thereto.

It is well known in the art that crystallizable polymeric hydrocarbons are extremely hydrophobic and resistant to penetration by aqueous solutions or aqueous suspensions. Furthermore, polar groups, such as amide, hydroxyl, ester and carboxyl groups are not present in the polymeric hydrocarbons, except as trace impurities. For these reasons, it is quite difficult to color or dye the polymeric hydrocarbons with any of the dyes normally employed for coloring filaments or fabrics. In some cases, light shades or tints of the polymeric hydrocarbons can be obtained with cellulose acetate dyes, but the fastness to washing is poor because there are no polar groups to serve as points of attachment or anchor sites for the dyes.

The prior art in U.S. 2,668,134 has described a process in which a polyethylene film is immersed in a saturated solution of sodium dichromate in sulfuric acid and the treated film can be dyed with basic dyes or printed readily. The process described in this patent is an oxidation reaction that produces carboxyl groups on the surface of the polymer. The chromium from the sodium dichromate is not introduced into the polymer and the oxidized polymer cannot be dyed with mordant or chelate dyes.

The process of U.S. Patent 2,886,471 was also considered and it was found that the treatment of polyolefin fabrics with aqueous chromic acid solution at room temperature or 80–85° C. does not render this fabric dyeable with a chrome mordant such as C. I. Mordant Red 36. In addition, fabric woven from polyolefins such as polyethylene containing about 0.12% chromium prepared by polymerization of ethylene by processes of U.S. Patent 2,967,857 and Australian Patent 217,121, does not dye with chrome mordant dyes. In has also been found that polyolefins obtained by the above prior art processes do not adhere well to rubber coatings such as neoprene rubber.

It is therefore apparent that the development of a different and more versatile process represents a highly desirable result.

Accordingly, it is an object of this invention to provide a method of treating the surfaces of crystallizable polymeric hydrocarbons in order to render valuable characteristics to said surfaces. Another object of this invention is to provide a method for treating the surfaces of crystallizable polymeric hydrocarbons with chromium compound to give a chemically combined layer of chromium compound at the polymer surface. Still another object is to provide a means for rendering the surfaces of crystallizable polyhydrocarbons dyeable with mordant dyes as well as to improve their adhesion to printing inks, sizing agents, coatings, laminants and the like. A still further object is to provide olefinic polymers having improved surface characteristics and containing an amount of chromium compound at their surface. Other objects will appear hereinafter.

In accordance with the broader features of this invention, it has been found that the surface properties of crystallizable polymeric hydrocarbons can be improved by the treatment of said surfaces with chromium trioxide solution. The presence of the chromium layer on the polymeric hydrocarbon surface renders the surface dyeable with mordant dyes and also improves the adherence thereto of printing inks, sizing agents, laminating agents, etc.

The practice of this invention is directed primarily to the improvement of the physical properties of the surfaces of crystallizable polymeric hydrocarbons. Among the hydrocarbons that can be used to form these polymers are styrene, ethylene, propylene, butylene, methylpentene and other related mono-olefinic hydrocarbons. The crystalline polymers can be prepared from the mono-olefinic hydrocarbons by various procedures, for example, polymerization of an α-mono-olfienic hydrocarbon with a metal-containing catalyst such as alumnium alkyls, molybdenum, chromium or vanadium oxides or similar metal-containing catalyst with or without an activator such as a titanium compound, sodium compound and the like. The polymeric hydrocarbons can be in the form of a fiber or other extruded or shaped object. The fibers of the polymeric hydrocarbons can be advantageously formed by any of the melt spinning techniques.

According to our invention a chemically combined layer of chromium compound is incorporated in the surface of the polymeric hydrocarbon by contacting the surface with a solution of a tertiary alkyl or cycloalkyl chromate ester and heating the surface. In the process chromic oxide is mixed with a tertiary alcohol including aliphatic and cycloalkyl tertiary alcohols usually employing an inert auxiliary solvent such as carbon tetrachloride, and the mixture used for treating the polyolefin surface. However, the tertiary alcohol may be the sole solvent. Thereafter the treated surface is heated until trivalent chromium compound is formed thereon. Thus chromic oxide is dissolved in a mixture of tert-butyl alcohol and carbon tetrachloride containing, for example, equal parts by weight of both components of the mixture. The solution is then diluted with additional carbon tetrachloride to produce a concentration of 0.1 to 5% by weight of chromium trioxide. This solution is applied to fabrics, films, sheets or other shaped objects of the polymeric hydrocarbon by dipping, spraying or other suitable procedures. The treated polymeric hydrocarbon is then heated to a temperature of 90 to 140° C. for about 1 to 5 minutes. The alcohol chromate reacts chemically with the polymeric hydrocarbon to produce trivalent chromium compounds that are permanently attached to the surface of the polymeric hydrocarbon and cannot be removed by washing. This treatment produces a chemically combined layer of chromium compound on the fiber surface. The chromium is not removed by water or organic solvents. This chromium layer imparts two valuable characteristics to the polymer: (a) the surface is readily dyeable to deep shades with mordant dyes, (b) the surface shows greatly improved adhesion toward printing inks, sizing agents, laminating agents, coatings, etc. The process is of particular value for treating polyhydrocarbon photographic film base in order to promote the adhesion of gelatin, polyvinyl alcohol and subs or undercoats in general. It is well known that polyhydrocarbon fibers and films show very poor adhesion toward practically all types of coatings and surface treatments. Only a few processes are known for improving the adhesion. These include electric arc (ozone) treatment and flame treatment. Treatments of this type may be difficult to use or may not give best results when used on textile fabrics and on the inside of tubes or bottles. The chromium oxide treatment of this invention, on the other hand, is readily adaptable to these materials.

The process of the invention uses only tertiary alcohols preferably containing 4 to 12 carbon atoms. Primary and secondary alcohols are not useful apparently because they are readily oxidized by the chromic oxide. The tertiary alcohols appear to form tertiary alkyl or cycloalkyl chromates in the process which are heated in contact with the polyolefin surface to form combined chromium compound thereon. Representative tertiary alcohols are, for example, tertiary butyl alcohol, 2-methyl-pentanol-2, 2-methyl-hexanol-2, 1-methyl-cyclohexanol and 2-methyl-norcamphanol-2. Tertiary alcohols made by hydrating dimers and trimers of propylene and butylene or isobutylene are of value. For example, 2,4,4-trimethylpentanol-2 is obtained by the hydration of di-isobutylene. The longer chain tertiary alcohols are very effective, in some cases more effective than, for example, butyl alcohol apparently because their chromate esters tend to wet the polyolefin surface more uniformly especially in the case of polyolefin films.

In general, any fiber, film or other shaped object made from crystallizable hydrocarbon polymers can be modified by the process of this invention to impart improved properties to the surface of the polymer. Suitable types of crystallizable hydrocarbon polymers are described by Natta in Makromolecular Chemie, 16, 213–237 (1955) and Angew. Chem., 68, 393 (1956). Crystallizable vinyl ether polymers can also be improved in accordance with this invention.

Suitable dyes that can be employed in dyeing any of the hydrocarbon polymers described herein include those set forth in the annual edition of the "Technical Manual and Yearbook of the American Association of Textile Chemists and Colorists," for example, the 1952 edition.

Among the dyes that can be used to color the crystallizable polymeric hydrocarbons within the scope of this invention are those dyes known to chelate or mordant with the metals or metal compounds that are incorporated into the hydrocarbon polymers. Among the dyes that can be used are those described in U.S. Patent 2,641,602 and 2,651,641. These dyes have the structural formulas:

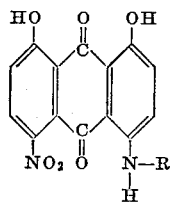

wherein R is a phenylethyl alcohol nucleus, and

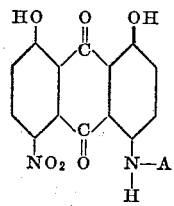

wherein A is a monocyclic benzene nucleus containing a

group wherein R represents hydrogen, methyl or ethyl.

The above dyes are merely representative of dyes that can be used. Other suitable dyes are described in the following patents:

Straley and Fisher U.S. Patent No. 2,865,909; Straley and Giles U.S. Patent No. 2,857,372; Straley and Wallace U.S. Patent No. 2,908,677, and Straley and Wallace U.S. Patent No. 2,843,580.

Among the materials that can be effectively laminated to the aforementioned polymeric materials by means of our invention are neoprene and other types of rubber coatings. These articles have considerable use as heavy-duty tarpaulins. Likewise the surfaces of the polymeric hydrocarbons which have been treated according to our invention show improved adhesion towards printing inks and sizing agents. Photographic film base made from a polyhydrocarbon so treated shows improved adhesion towards gelatin, polyvinyl alcohol, subs and undercoats.

A further understanding of our invention will be had from a consideration of the following examples which are set forth for illustrating certain embodiments thereof.

*Example 1*

A solution of t-butyl chromate was prepared by dissolving 0.5 g. of chromic acid (chromium trioxide) in a mixture of 50 ml. of t-butyl alcohol and 50 ml. of carbon tetrachloride, and then diluting with 100 ml. of carbon tetrachloride. The solution contained 0.25% chromium trioxide on a weight per volume basis. The solution was sprayed on a fabric made from crystallizable polypropylene yarn. The treated fabric was heated at 140° C. for one minute. A light, grayish-brown color was produced indicating that the chromium had been reduced to the trivalent state. This fabric dyed well with chrome mordant dyes and the dyes were fast to washing and light. The mordant dyes suitable for use with the metal compounds in this and subsequent examples are well known in the textile art and are represented by Omega Chrome Aurine GL (C.I. No. 201), Omega Chrome Brown (C.I. No. 98), Omega Chrome Red B (C.I. No. 652), and Alizarin Red S (C.I. No. 1034).

The treated fabric had excellent adhesion toward neoprene and GRS rubber coatings.

*Example 2*

Polyethylene film was painted with the chromium trioxide solution described in Example 1. It was then heated at 90° C. for 3 minutes. The treated film had trivalent chromium combined on the surface of the film and could be dyed with chrome mordant dyes. The surface of the film also exhibited improved adhesion to printing inks.

*Example 3*

A fabric made from poly(4-methylpentene-1) was treated with a solution of $CrO_3$ as described in Example 1 to give an add-on of about 0.2%, on a dry basis. The fabric was then heated at 130–140° for 1 minute. A light, grayish-brown color was produced. Coatings of neoprene, GRS rubber and natural rubber had excellent adhesion on the treated fabric.

The treated fabric also had improved affinity for printing inks and mordant dyes.

*Example 4*

A photographic film base made from crystalline polypropylene was drafted by a factor of 2.5–3.0 in each direction and was then heat-treated. The film was passed through a solution of $CrO_3$ in $CCl_4$-tertiary butyl alcohol to give an add-on of 0.03–01% $CrO_3$, on a dry basis. The film was then heated at 110–120° for 30 minutes. The treated film had excellent adhesion for poly(vinyl alcohol), gelatin and other types of photographic coatings.

*Example 5*

A photographic film base made from crystalline polystyrene was treated as described in the above example. It had excellent adhesion for gelatin and poly(vinyl alcohol).

The treated film also had improved affinity for printing inks and mordant dyes.

*Example 6*

A fabric made from poly(allylbenzene) was treated as described above to give an add-on of 0.3% $CrO_3$. After heating at 140–150° for 2 minutes, the fabric had excellent adhesion for neoprene, natural rubber and poly(vinyl chloride) coatings.

The treated fabric showed improved affinity for printing inks and mordant dyes.

Example 7

2-methyl-pentanol-2 was used in place of tert-butyl alcohol in Example 1. The treated fabric dyed well with chrome mordant dyes and showed excellent adhesion for rubber coatings.

Example 8

One gram of chromic acid (chromium trioxide, $CrO_3$) was dissolved in 50 ml. of 2,4,4-trimethylpentanol-2 and 50 ml. of carbon tetrachloride. The solution was diluted with 100 ml. of carbon tetrachloride.

A. Polypropylene film was dipped into the solution, allowed to drain, then heated at 100–110° C. for 15 minutes. The film had a gray-green tint, showing that the chromium was converted to the trivalent state. The film surface was uniformly colored and showed very little evidence of streakiness or uneven wetting. In this respect it was superior to films obtained with the tert-butyl ester. The treated film dyed well with chrome mordant dyes and had improved adhesion for poly(vinyl alcohol), gelatin and photographic subs.

Films of crystalline polystyrene and poly(allylbenzene) were treated as described above. They showed improved adhesion for various coatings.

B. Polyethylene fabric was sprayed with the solution and heated at 85–90° for 20 minutes. The fabric dyed well with chrome mordant dyes and showed improved adhesion for neoprene coatings.

Example 9

One gram of $CrO_3$ was dissolved in 40 ml. of 1-methylcyclohexanol and 60 ml. of carbon tetrachloride. The solution was diluted with 150 ml. of tetrachlorethane.

A. Crystalline polypropylene film was dipped into the solution, air dried, then heated at 110–120° for 10 minutes. The treated film showed good adhesion for printing inks, lacquers and paints.

B. Polypropylene fabric was sprayed with the solution, air dried, then heated at 100–120° for 10 minutes. The fabric showed excellent adhesion for neoprene and natural rubber coatings.

Example 10

Tri-isobutylene was hydrated to form a mixture of 12-carbon tert-alcohols. This mixture was employed as the tertiary alcohol as described in Example 9. The treated fabric and film had improved adhesive properties.

The invention has been described in considerable detail with particular reference to certain preferred embodiments thereof, but it will be understood that variations and modifications can be effected within the spirit and scope of the invention as described hereinabove and as defined in the appended claims.

We claim:

1. As a composition of matter, a shaped crystalline polymerized α-monoolefinic hydrocarbon of improved surface properties, only the surface of which carries a content of a chemically combined trivalent chromium compound formed by contacting the surface with a solution of a chromate ester of a tertiary alkyl or tertiary cyclo-alkyl alcohol and heating the surface.

2. A composition according to claim 1 wherein the polymeric hydrocarbon is polyethylene.

3. A composition according to claim 1 wherein the polymeric hydrocarbon is polypropylene.

4. A composition according to claim 1 where in the polymeric hydrocarbon is poly(4-methyl-pentene-1).

5. A composition according to claim 1 wherein the polymeric hydrocarbon is polystyrene.

6. A composition according to claim 1 wherein the polymeric hydrocarbon is poly(allylbenzene).

7. A method for improving the dyeing properties of a fiber of a crystallizable polymeric hydrocarbon which comprises applying a solution of a chromate ester of a tertiary alkyl or tertiary cyclo-alkyl alcohol onto said fiber and heating the fiber thus treated until trivalent chromium is formed.

References Cited by the Examiner

UNITED STATES PATENTS 2,970,977  2/1961  Sunden et al. _____ 260—30.8
3,097,044  7/1963  Skeuse _____ 8—55

NORMAN G. TORCHIN, *Primary Examiner.*

D. LEVY, *Assistant Examiner.*